US012087513B2

United States Patent
Iwama et al.

(10) Patent No.: US 12,087,513 B2
(45) Date of Patent: Sep. 10, 2024

(54) MULTILAYER CAPACITOR

(71) Applicant: TDK CORPORATION, Tokyo (JP)

(72) Inventors: Masahiro Iwama, Tokyo (JP); Toru Onoue, Tokyo (JP); Kohei Sumiya, Tokyo (JP)

(73) Assignee: TDK CORPORATION, Tokyo (JP)

( * ) Notice: Subject to any disclaimer, the term of this patent is extended or adjusted under 35 U.S.C. 154(b) by 104 days.

(21) Appl. No.: 17/946,792

(22) Filed: Sep. 16, 2022

(65) Prior Publication Data
US 2023/0290578 A1 Sep. 14, 2023

(30) Foreign Application Priority Data

Mar. 14, 2022 (JP) .................. 2022-039271

(51) Int. Cl.
*H01G 4/35* (2006.01)
*H01G 4/012* (2006.01)
*H01G 4/12* (2006.01)
*H01G 4/228* (2006.01)
*H01G 4/30* (2006.01)

(52) U.S. Cl.
CPC .............. *H01G 4/35* (2013.01); *H01G 4/012* (2013.01); *H01G 4/1227* (2013.01); *H01G 4/228* (2013.01); *H01G 4/30* (2013.01)

(58) Field of Classification Search
CPC ........ H01G 4/35; H01G 4/012; H01G 4/1227; H01G 4/228; H01G 2/065; H01G 4/008; H01G 4/1218; H01G 4/232; H01G 4/30
See application file for complete search history.

(56) References Cited

U.S. PATENT DOCUMENTS

| | | | |
|---|---|---|---|
| 2016/0189867 A1* | 6/2016 | Zaima | H01G 4/012 |
| | | | 361/301.4 |
| 2016/0247632 A1* | 8/2016 | Tsukida | H01G 4/0085 |
| 2016/0293335 A1* | 10/2016 | Adachi | H01G 4/40 |
| 2017/0345562 A1* | 11/2017 | Shimada | H01G 2/06 |
| 2017/0345566 A1* | 11/2017 | Tanaka | C23C 14/185 |
| 2017/0352479 A1* | 12/2017 | Sawada | H01G 4/30 |
| 2020/0176186 A1* | 6/2020 | Moon | H01G 4/012 |

FOREIGN PATENT DOCUMENTS

JP 2001-102243 A 4/2001

* cited by examiner

*Primary Examiner* — Michael P McFadden (74) *Attorney, Agent, or Firm* — Oliff PLC (57) ABSTRACT

In a multilayer capacitor, when a distance between a surface of a first external electrode at an apex position of the first external electrode and a curved surface is defined as Ht, and a distance between the apex position and an apex position of the main surface in a facing direction of the pair of main surfaces is defined as Y, 0<Y<Ht is satisfied for each of the pair of first external electrodes at least on the curved surface side, and a distance between a surface of the second external electrode at an apex position of the second external electrode and the main surface is defined as Hs, Ht>Hs is satisfied for each of the pair of second external electrodes on both sides of the pair of main surfaces.

1 Claim, 10 Drawing Sheets

|  | Ht(μm) | Hs(μm) | Y(μm) |
|---|---|---|---|
| Ave. | 27.16 | 18.93 | 9.95 |
| OPTIMUM RANGE | 21~33 | 13~25 | 6~14 |

*Fig.9B*

|  | Hw(μm) | Ts(μm) |
|---|---|---|
| Ave. | 26.44 | 49.78 |
| OPTIMUM RANGE | 20~32 | 44~56 |

Fig.10

| | Ht(μm) | Hs(μm) | Y(μm) | STABILITY OF MOUNTING | PICK-UP PERFORMANCE |
|---|---|---|---|---|---|
| EXAMPLE | 27 | 20 | 10 | OK | OK |
| COMPARATIVE EXAMPLE 1 | 15 | 30 | 8 | NG | OK |
| COMPARATIVE EXAMPLE 2 | 27 | 20 | 40 | OK | NG |
| COMPARATIVE EXAMPLE 3 | 27 | 20 | -10 | NG | OK |

MULTILAYER CAPACITOR

TECHNICAL FIELD

The present disclosure relates to a multilayer capacitor.

BACKGROUND

As a conventional multilayer capacitor, for example, there is a feed-through capacitor described in Japanese Unexamined Patent Publication No. 2001-102243. The conventional feed-through capacitor is a so-called three-terminal type multilayer ceramic capacitor. In the feed-through capacitor, a feed-through conductor layer and a ground electrode layer are alternately disposed inside a laminate formed by laminating a plurality of dielectric layers. The feed-through conductor layer is led out to a pair of first end surfaces facing each other. The ground electrode layer faces the feed-through conductor layer with a dielectric layer interposed therebetween and is led out to the other pair of second end surfaces of the laminate facing each other. A pair of input/output terminals connected to both end portions of the feed-through conductor layer are formed on the pair of first end surfaces. Ground terminals connected to both end portions of the ground electrode layer are formed on the pair of second end surfaces.

SUMMARY

The three-terminal type multilayer capacitor as described above is mounted on an electronic device or the like by soldering terminal electrodes to a circuit board or the like. On the other hand, there are cases in which an end surface of an element body of the multilayer capacitor is curved in a convex shape, for example, in a lamination direction of internal electrodes. Therefore, it is a technical problem to improve stability of mounting and pick-up performance in consideration of the shape of the element body.

The present disclosure has been made to solve the above-described problems, and an objective of the present disclosure is to provide a multilayer capacitor in which improvement in stability of mounting and pick-up performance can be achieved.

A multilayer capacitor according to one aspect of the present disclosure includes an element body including a pair of end surfaces facing each other, and a pair of side surfaces and a pair of main surfaces extending in a facing direction of the pair of end surfaces between the pair of end surfaces, a plurality of first internal electrodes disposed in a facing direction of the pair of main surfaces in the element body and extending in the facing direction of the pair of end surfaces, a plurality of second internal electrodes disposed in the facing direction of the pair of main surfaces in the element body and extending in a facing direction of the pair of side surfaces, a pair of first external electrodes disposed on the pair of end surfaces to wrap around the pair of side surfaces and the pair of main surfaces, and a pair of second external electrodes disposed on the pair of side surfaces to wrap around the pair of main surfaces and to be spaced apart from the first external electrodes, in which at least one of the pair of main surfaces is a curved surface which is curved in a convex shape, when viewed from the facing direction of the pair of side surfaces, when a distance between a surface of the first external electrode at an apex position of the first external electrode and the main surface is defined as Ht, and a distance between the apex position and an apex position of the main surface in the facing direction of the pair of main surfaces is defined as Y, $0<Y<Ht$ is satisfied for each of the pair of first external electrodes at least on the curved surface side, and when viewed from the facing direction of the pair of end surfaces, a distance between a surface of the second external electrode at an apex position of the second external electrode and the main surface is defined as Hs, Ht>Hs is satisfied for each of the pair of second external electrodes on both sides of the pair of main surfaces.

In this multilayer capacitor, when $0<Y$ is satisfied at least on the curved surface side, even if at least one of the pair of main surfaces is formed as a convex curved surface, the element body can be prevented from protruding with respect to the first external electrode in the facing direction of the main surfaces. Thereby, self-alignment of the multilayer capacitor at the time of mounting is facilitated. Also, when $Y<Ht$ is satisfied at least on the curved surface side, the element body insufficiently protruding in the facing direction of the pair of main surfaces can be prevented. Thereby, pick-up performance of the multilayer capacitor at the time of mounting can be improved. Further, when Ht>Hs is satisfied on both sides of the pair of main surfaces, a thickness of the first external electrode is sufficiently secured regardless of which main surface is used as a mounting surface, and stability of mounting can be improved.

When viewed in the facing direction of the pair of main surfaces, when a distance between a surface of the first external electrode at an apex position of the first external electrode and the side surface is defined as Hw, and a distance between a surface of the second external electrode at an apex position of the second external electrode and the side surface is defined as Ts, Ts>Hw may be satisfied for each of the pair of second external electrodes. In this case, a sufficient mounting area of the second external electrode can be secured, and the self-alignment of the multilayer capacitor at the time of mounting is further facilitated.

DETAILED DESCRIPTION

Hereinafter, a preferred embodiment of a multilayer capacitor according to one aspect of the present disclosure will be described in detail with reference to the drawings.

Figure 1:
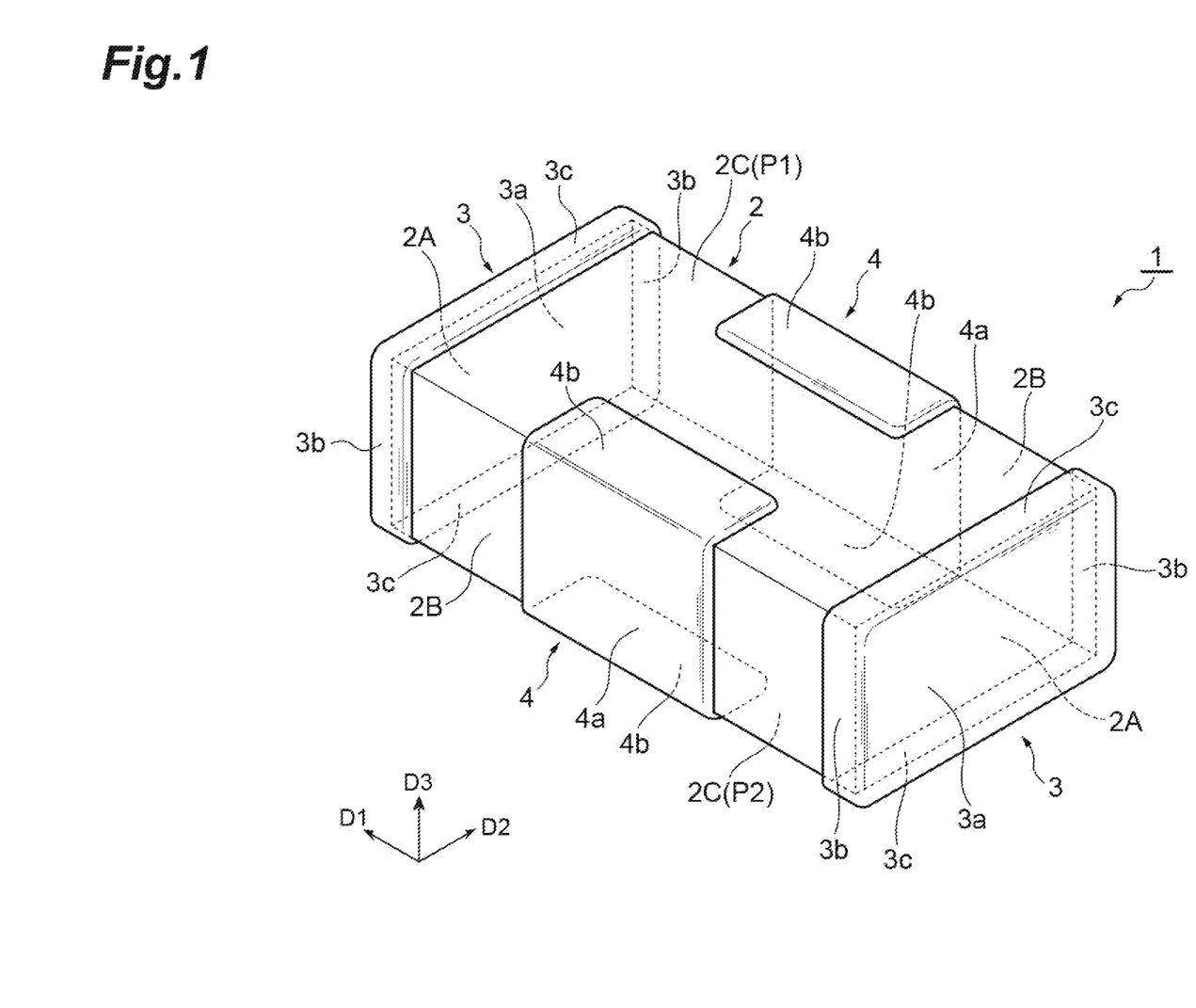
FIG. 1 is a schematic perspective view of a multilayer capacitor according to one embodiment of the present disclosure.

FIG. 1 is a schematic perspective view of a multilayer capacitor according to one embodiment of the present disclosure. As illustrated in FIG. 1, a multilayer capacitor 1 according to the present embodiment is configured as a so-called three-terminal type feed-through capacitor. The multilayer capacitor 1 can be mounted on, for example, a circuit board of an electronic device. A chip size of the multilayer capacitor 1 is, for example, a 3216 size (length 3.2 mm×width 1.6 mm×height 1.6 mm) A chip size of the multilayer capacitor 1 is not particularly limited, and may have a size other than the 3216 size.

As illustrated in FIG. 1, the multilayer capacitor 1 includes an element body 2, a pair of first external electrodes 3 and 3, and a pair of second external electrodes 4 and 4. The pair of first external electrodes 3 and 3 are electrodes that function as external electrodes for signals. The pair of second external electrodes 4 and 4 are electrodes that function as external electrodes for grounding.

The element body 2 is formed by laminating a plurality of dielectric layers. The dielectric layers are each formed of a sintered body of a ceramic green sheet containing, for example, a dielectric material (a $BaTiO_3$-based dielectric ceramic, a $Ba(Ti, Zr)O_3$-based dielectric ceramic, a $(Ba, Ca)TiO_3$-based dielectric ceramic, or the like). In an actual element body 2, the dielectric layers are integrated to such an extent that boundaries therebetween cannot be visually recognized. A shape of the element body 2 is a substantially rectangular parallelepiped shape. The rectangular parallelepiped shape may include a shape in which a corner portion and a ridge line portion are chamfered. The rectangular parallelepiped shape may include a shape in which the corner portion and the ridge line portion are rounded.

The element body 2 has a pair of end surfaces 2A and 2A facing each other, a pair of side surfaces 2B and 2B facing each other, and a pair of main surfaces 2C and 2C facing each other. The pair of side surfaces 2B and 2B and the pair of main surfaces 2C and 2C extend in a facing direction of the pair of end surfaces 2A and 2A between the pair of end surfaces 2A and 2A. The pair of end surfaces 2A and 2A, the pair of side surfaces 2B and 2B, and the pair of main surfaces 2C and 2C are in a state of being perpendicular to each other.

One of the pair of main surfaces 2C and 2C is a mounting surface (a surface facing a circuit board or the like) when the multilayer capacitor 1 is mounted on the circuit board or the like of an electronic device. At least one of the pair of main surfaces 2C and 2C is a curved surface P1 that is curved in a convex shape. In the present embodiment, one of the pair of main surfaces 2C and 2C (the main surface 2C on an upper side of the paper surface in FIG. 1) is the curved surface P1 that is gently curved in a convex shape. Further, the other of the pair of main surfaces 2C and 2C (the main surface 2C on a lower side of the paper surface in FIG. 1) is a flat surface P2 that is flat compared to the curved surface P1.

Here, the facing direction of the pair of end surfaces 2A and 2A is referred to as D1, a facing direction of the pair of side surfaces 2B and 2B is referred to as D2, and a facing direction of the pair of main surfaces 2C and 2C is referred to as D3. The facing direction D1 of the pair of end surfaces 2A and 2A corresponds to a length direction of the element body 2. The facing direction D2 of the pair of side surfaces 2B and 2B corresponds to a width direction of the element body 2. The facing direction D3 of the pair of main surfaces 2C and 2C corresponds to a height direction of the element body 2. The facing direction D3 of the pair of main surfaces 2C and 2C coincides with a lamination direction of the plurality of dielectric layers constituting the element body 2.

The pair of first external electrodes 3 and 3 are provided on the pair of end surfaces 2A and 2A. The first external electrode 3 includes a main body part 3a that covers the entirety of the end surface 2A, wraparound parts 3b and 3b that wrap around edge portions of the pair of side surfaces 2B and 2B from the main body part 3a, and wraparound parts 3c and 3c that wrap around edge portions of the pair of main surfaces 2C and 2C from the main body part 3a.

The first external electrode 3 is formed on the end surface 2A to cover a lead-out portion (connection part 6b to be described later) of a first internal electrode 6. The first external electrode 3 may be formed to include a sintered layer covering the lead-out portion and a plated layer covering the sintered layer. The sintered layer may contain a metal or glass. The metal may be Cu, Ni, Ag, or the like. The plated layer may be either a single layer or a multilayer. When the plated layer is a multilayer, a Ni plated layer, a Sn layer covering the Ni plated layer, and the like may be included. In the present embodiment, the first external electrode 3 has a three-layer structure constituted by a Cu sintered layer 3A, a Ni plated layer 3B, and a Sn plated layer 3C (see FIG. 2 or the like).

The pair of second external electrodes 4 and 4 are provided at central portions in the length direction of the element body 2 on the pair of side surfaces 2B and 2B. The second external electrode 4 includes a main body part 4a extending in the height direction of the element body 2 with a predetermined width on the side surface 2B, and wraparound parts 4b and 4b that wrap around edge portions of the pair of main surfaces 2C and 2C from the main body part 4a.

The second external electrode 4 is formed on the side surface 2B to cover a lead-out portion (connection part 7b to be described later) of a second internal electrode 7. Similarly to the first external electrode 3, the second external electrode 4 may be formed to include a sintered layer covering the lead-out portion and a plated layer covering the sintered layer. The sintered layer may contain a metal or glass. The metal may be Cu, Ni, Ag, or the like. The plated layer may be either a single layer or a multilayer. When the plated layer is a multilayer, a Ni plated layer, a Sn layer covering the Ni plated layer, and the like may be included. In the present embodiment, the second external electrode 4 has a three-layer structure constituted by a Cu sintered layer 4A, a Ni plated layer 4B, and a Sn plated layer 4C (see FIG. 3 or the like).

Figure 2:
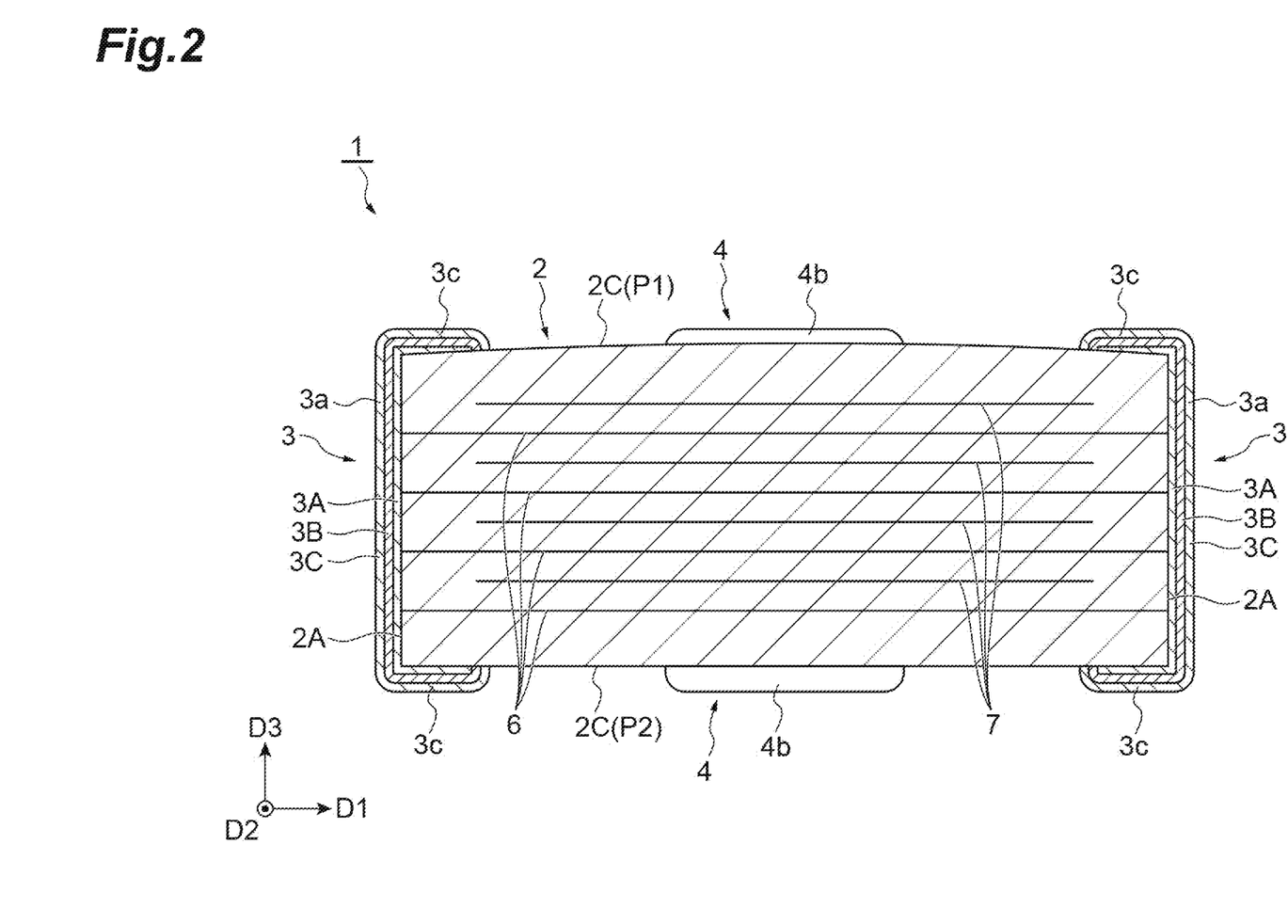
FIG. 2 is a cross-sectional view between a pair of end surfaces of the multilayer capacitor.
Figure 3:
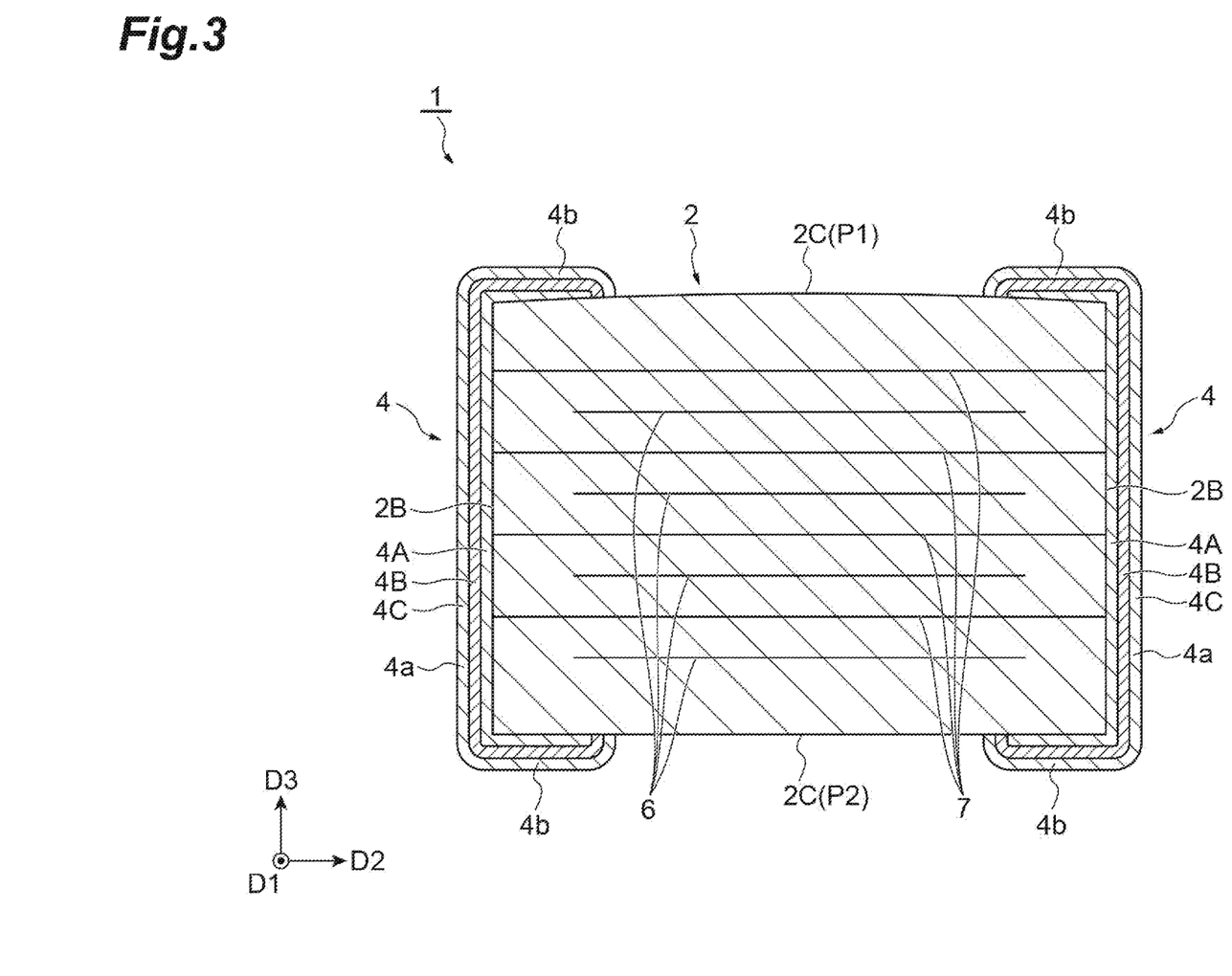
FIG. 3 is a cross-sectional view between a pair of side surfaces of the multilayer capacitor.

As illustrated in FIGS. 2 to 5, a plurality of first internal electrodes 6 and a plurality of second internal electrodes 7 are disposed in the element body 2. As a constituent material of the first internal electrode 6 and the second internal electrode 7, a conductive material (for example, Ni, Cu, or the like) generally used as an internal electrode of a lamination-type electric element can be exemplified. The first internal electrode 6 and the second internal electrode 7 are formed as a sintered body of a conductive paste containing the above-described conductive material. As illustrated in FIGS. 2 and 3, the plurality of first internal electrodes 6 and the plurality of second internal electrodes 7 are alternately laminated with a dielectric layer interposed therebetween in the facing direction D3 of the pair of main surfaces 2C and 2C.

Figure 4:
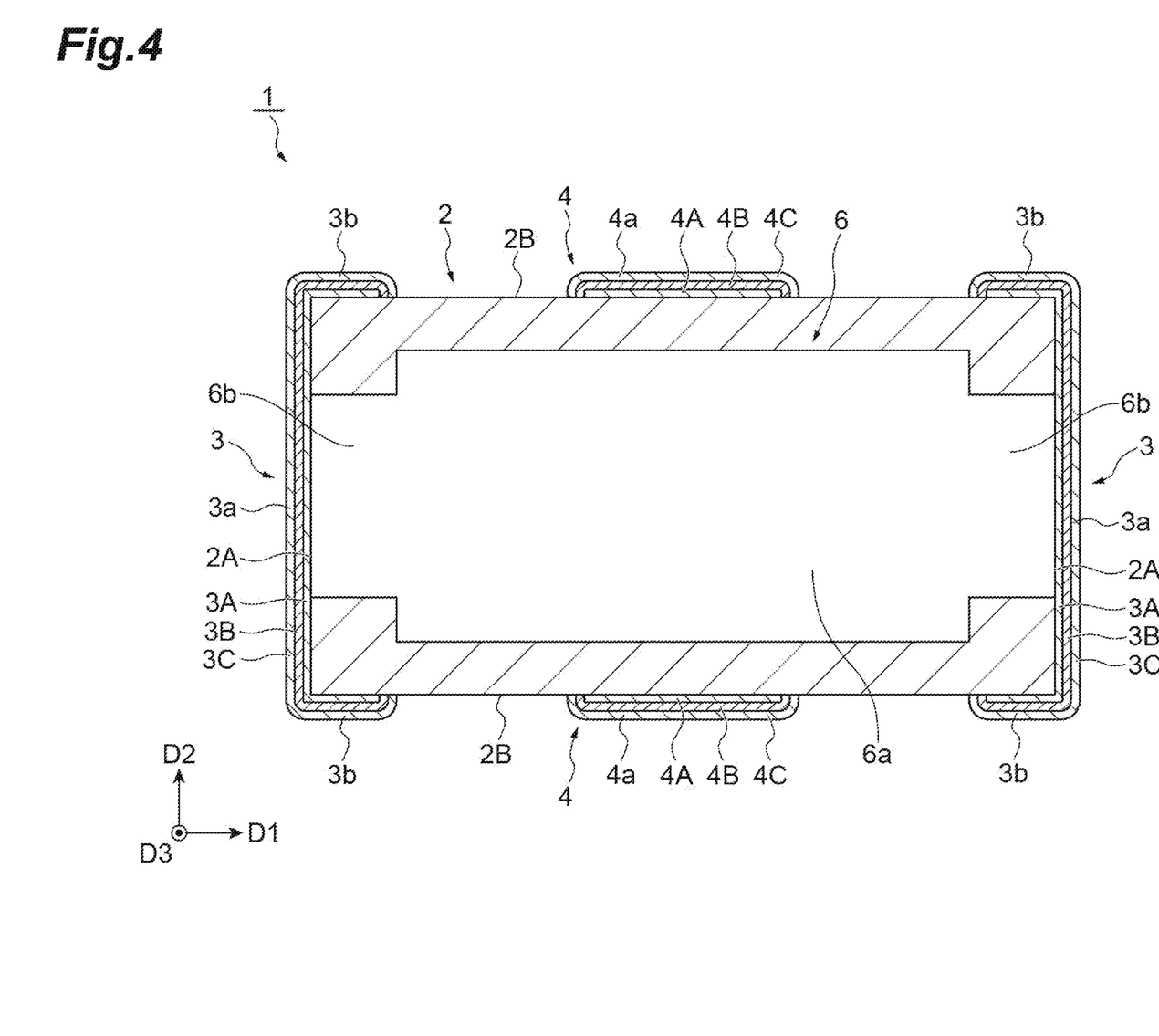
FIG. 4 is a cross-sectional view of the multilayer capacitor in a plane of a first internal electrode.

As illustrated in FIG. 4, the first internal electrode 6 includes a main electrode part 6a and connection parts 6b. The main electrode part 6a has a rectangular shape in a plan view. A long side of the main electrode part 6a extends in the facing direction D1 of the pair of end surfaces 2A and 2A.

A short side of the main electrode part 6a extends in the facing direction D2 of the pair of side surfaces 2B and 2B. The connection parts 6b protrude in band shapes from central portions of the short sides of the main electrode part 6a and extend to the pair of end surfaces 2A and 2A. Thereby, the first internal electrode 6 is electrically connected to the first external electrodes 3 and 3 on the pair of end surfaces 2A and 2A. A width of each of the connection parts 6b is smaller than, for example, the short side of the main electrode part 6a.

Figure 5:
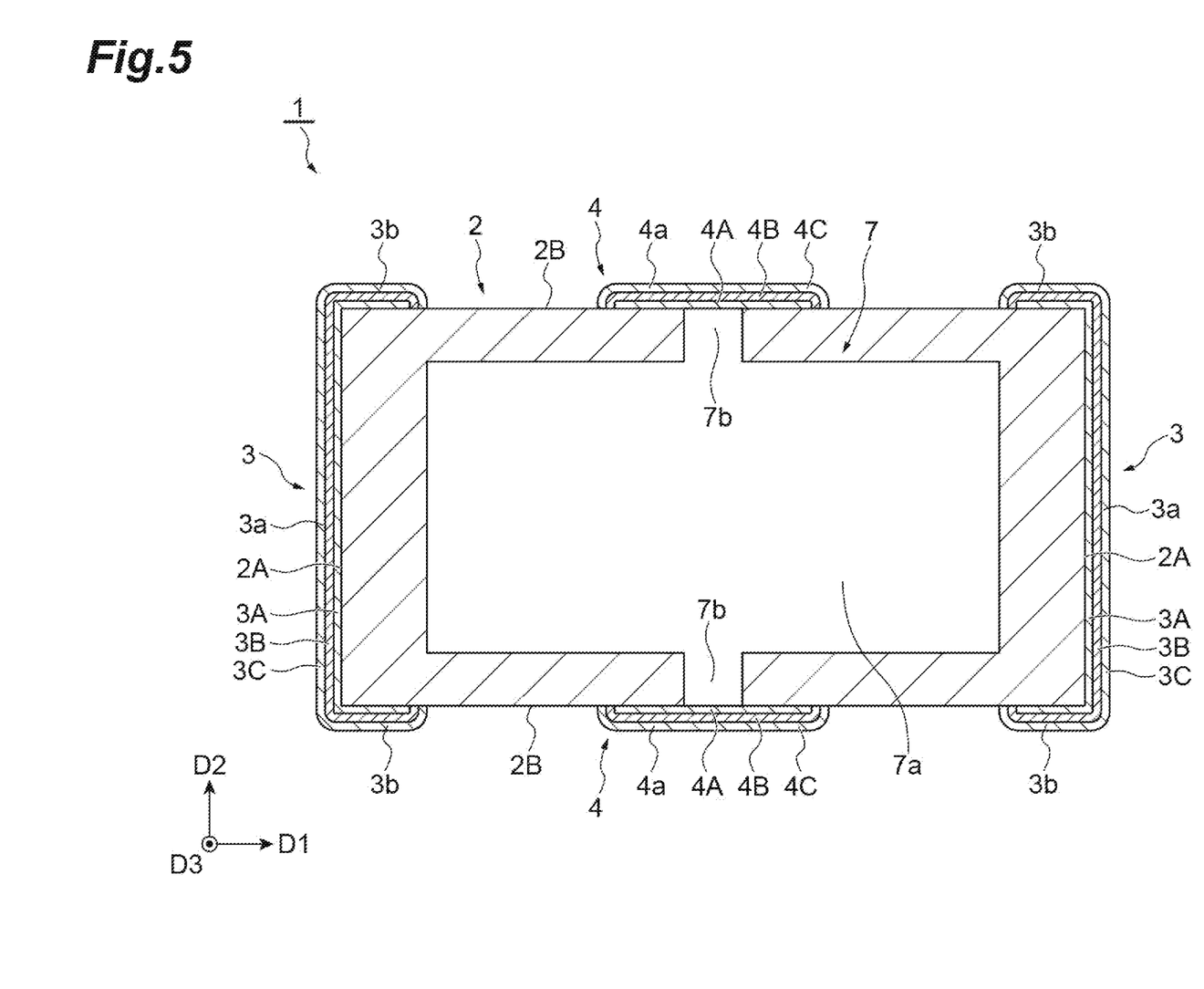
FIG. 5 is a cross-sectional view of the multilayer capacitor in a plane of a second internal electrode.

As illustrated in FIG. 5, the second internal electrode 7 includes a main electrode part 7a and connection parts 7b. The main electrode part 7a has a rectangular shape in a plan view. A long side of the main electrode part 7a extends in the facing direction D1 of the pair of end surfaces 2A and 2A. A short side of the main electrode part 7a extends in the facing direction D2 of the pair of side surfaces 2B and 2B. The main electrode part 7a is positioned to overlap the main electrode part 6a of the first internal electrode 6 when viewed from the facing direction D3 of the pair of main surfaces 2C and 2C. The connection parts 7b protrude in band shapes from central portions of the long sides of the main electrode part 6a and extend to the pair of side surfaces 2B and 2B. Thereby, the second internal electrode 7 is electrically connected to the second external electrodes 4 and 4 on the pair of side surfaces 2B and 2B. A width of each of the connection parts 7b is smaller than, for example, the width of the connection part 6b of the first internal electrode 6.

Next, a dimensional relationship between the element body 2, the first external electrode 3, and the second external electrode 4 in the above-described multilayer capacitor 1 will be described with reference to FIGS. 6 to 8. Further, the first external electrode 3 and the second external electrode 4 each have a three-layer structure constituted by the sintered layer and the plated layers as described above, but in FIGS. 6 to 8, the first external electrode 3 and the second external electrode 4 are illustrated in a state in which the three layers are integrated to avoid complexity of illustration.

Figure 6:
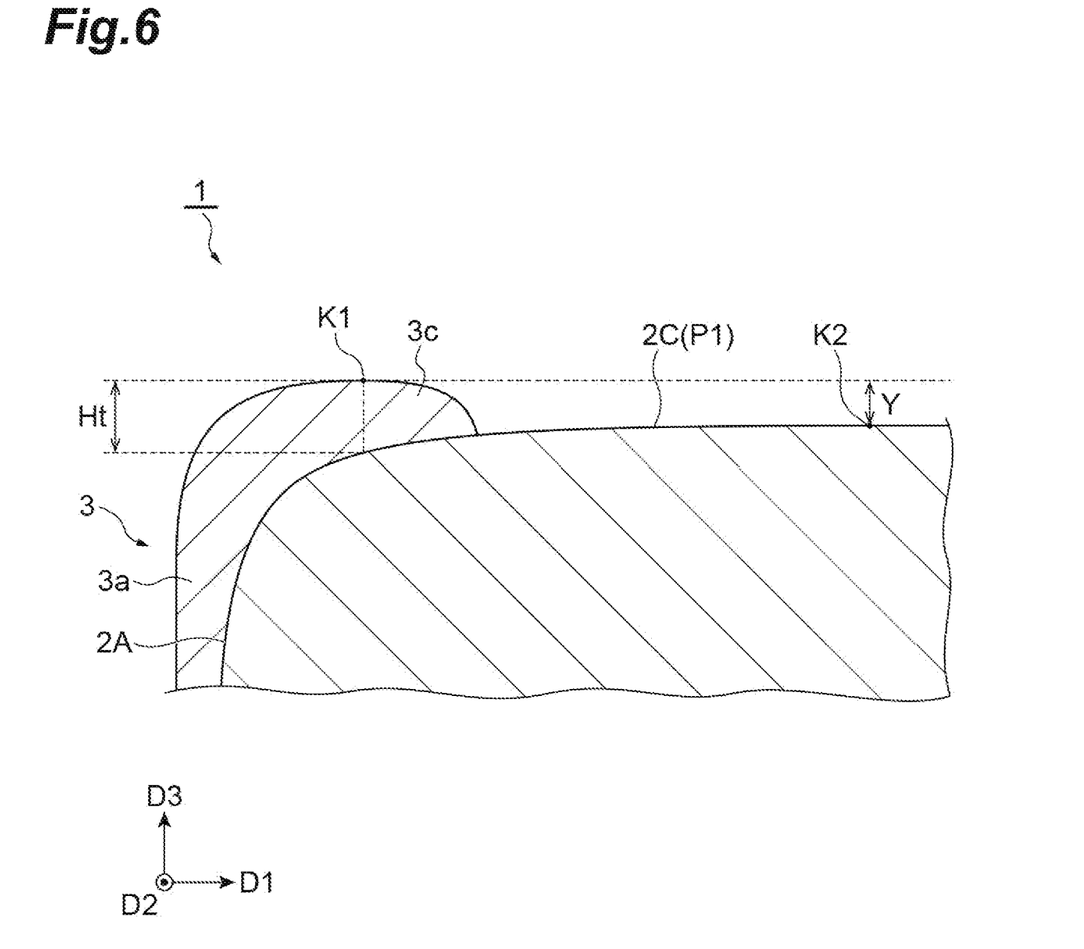
FIG. 6 is an enlarged view of a main part of the multilayer capacitor when viewed from a facing direction of the pair of side surfaces.

FIG. 6 is an enlarged view of a main part of the multilayer capacitor when viewed from the facing direction of the pair of side surfaces. In FIG. 6, one side of the end surfaces 2A and 2A is illustrated, but the other side of the end surfaces 2A and 2A has the same configuration. As illustrated in FIG. 6, in the multilayer capacitor 1, a distance between a surface of the first external electrode 3 at an apex position K1 of the first external electrode 3 and the main surface 2C when viewed from the facing direction D2 of the pair of side surfaces 2B and 2B is defined as Ht.

The apex position K1 of the first external electrode 3 is at a position of the first external electrode 3 that is farthest from the element body 2 in the height direction (the facing direction D3 of the pair of main surfaces 2C and 2C). Here, the apex position K1 is positioned at the wraparound part 3c of the first external electrode 3 that wraps around the main surface 2C. When a perpendicular line is drawn from the apex position K1 of the first external electrode 3 toward the main surface 2C in the facing direction D3 of the pair of main surfaces 2C and 2C, Ht corresponds to a length until the perpendicular line comes into contact with the main surface 2C from the apex position K1.

Also, as illustrated in FIG. 6, in the multilayer capacitor 1, a distance between the apex position K1 of the first external electrode 3 and an apex position K2 of the main surface 2C in the facing direction D3 of the pair of main surfaces 2C and 2C when viewed from the facing direction D2 of the pair of side surfaces 2B and 2B is defined as Y. The apex position K2 of the main surface 2C is a highest position of the main surfaces 2C in the height direction (the facing direction D3 of the pair of main surfaces 2C and 2C). When a perpendicular line is drawn from a line in a facing direction of the pair of end surfaces 2A and 2A passing through the apex position K1 of the first external electrode 3 toward the main surface 2C in the facing direction D3 of the pair of main surfaces 2C and 2C, Y corresponds to a length until the perpendicular line comes into contact with the main surface 2C from the line.

When Ht and Y are defined as described above, in the multilayer capacitor 1, $0<Y<Ht$ is satisfied for each of the pair of first external electrodes 3 and 3 at least on the curved surface P1 side. When $Y=0$, a height of the main surface 2C at the apex position K2 is equal to a height of the first external electrode 3. When $Y<0$, the height of the main surface 2C at the apex position K2 becomes larger than the height of the first external electrode 3. This case means that the main surface 2C protrudes with respect to the first external electrode 3 in the height direction of the element body 2. In the multilayer capacitor 1, since $0<Y$ is satisfied, the main surface 2C does not protrude with respect to the first external electrode 3 in the height direction of the element body 2.

When $Y=Ht$, a height difference between the main surface 2C and the first external electrode 3 is equal to a thickness in the height direction of the first external electrode 3 at the apex position K1. When $Y>Ht$, the height difference between the main surface 2C and the first external electrode 3 becomes larger than the thickness in the height direction of the first external electrode 3 at the apex position K1. In the multilayer capacitor 1, since $Y<Ht$ is satisfied, the height difference between the main surface 2C and the first external electrode 3 is suppressed to less than the thickness in the height direction of the first external electrode 3 at the apex position K1 in the height direction of the element body 2.

Figure 7:
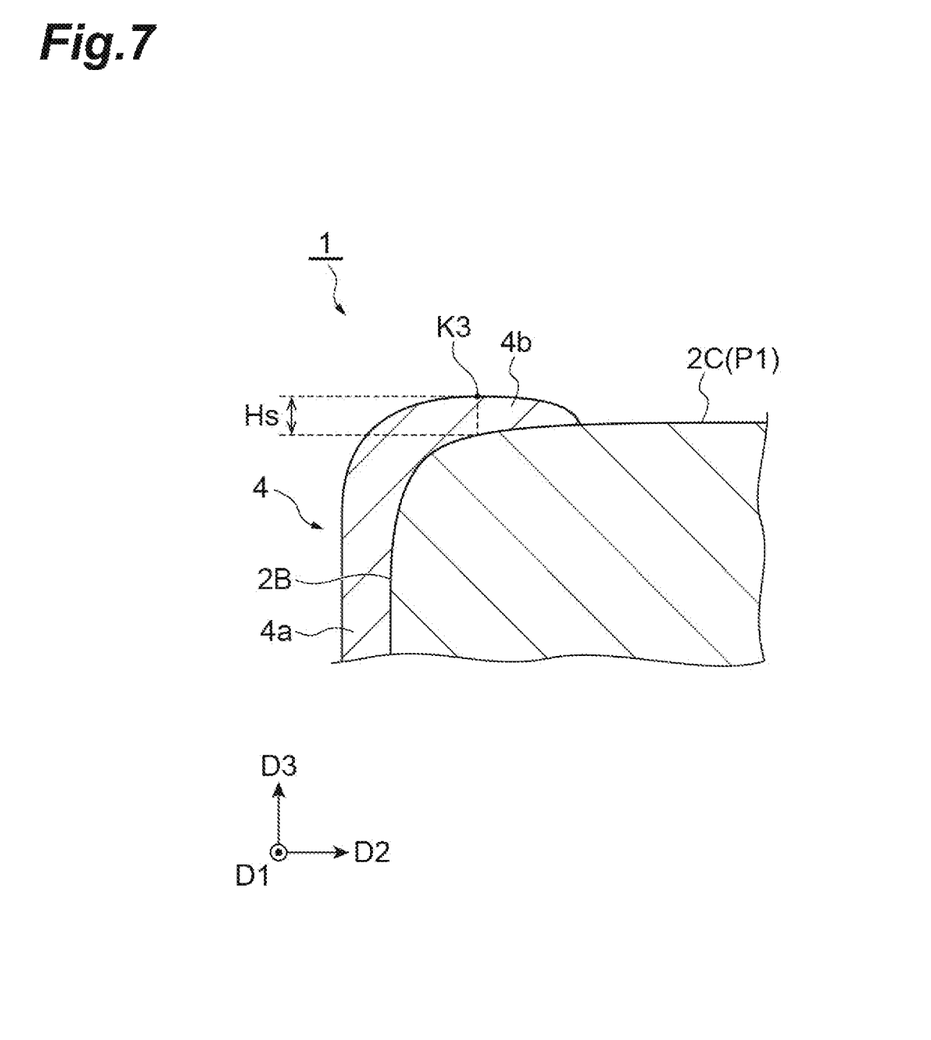
FIG. 7 is an enlarged view of a main part of the multilayer capacitor when viewed from a facing direction of the pair of end surfaces.

FIG. 7 is an enlarged view of a main part of the multilayer capacitor when viewed from the facing direction of the pair of end surfaces. In FIG. 7, one side of the side surfaces 2B and 2B is illustrated, but the other side of the side surfaces 2B and 2B has the same configuration. As illustrated in FIG. 7, in the multilayer capacitor 1, a distance between a surface of the second external electrode 4 at an apex position K3 of the second external electrode 4 and the main surface 2C when viewed from the facing direction D1 of the pair of end surfaces 2A and 2A is defined as Hs.

The apex position K3 of the second external electrode 4 is at a position of the second external electrode 4 that is farthest from the element body 2 in the height direction (the facing direction D3 of the pair of main surfaces 2C and 2C). The apex position K3 is positioned at the wraparound part 4b of the second external electrode 4 that wraps around the main surface 2C. When a perpendicular line is drawn from the apex position K3 of the second external electrode 4 toward the main surface 2C in the facing direction D3 of the pair of main surfaces 2C and 2C, Hs corresponds to a length until the perpendicular line comes into contact with the main surface 2C from the apex position K3.

When Hs is defined as described above, in the multilayer capacitor 1, $Ht>Hs$ is satisfied for each of the pair of second external electrodes 4 and 4 on both sides of the pair of main surfaces 2C and 2C. When $Ht=Hs$, a thickness in the height direction of the first external electrode 3 at the apex position K1 is equal to a thickness in the height direction of the second external electrode 4 at the apex position K3. When $Ht<Hs$, the thickness in the height direction of the first external electrode 3 at the apex position K1 is smaller than the thickness in the height direction of the second external electrode 4 at the apex position. In the multilayer capacitor 1, since Ht>Hs is satisfied, the thickness in the height direction of the first external electrode 3 at the apex position K1 is larger than the thickness in the height direction of the second external electrode 4 at the apex position K3.

Figure 8:
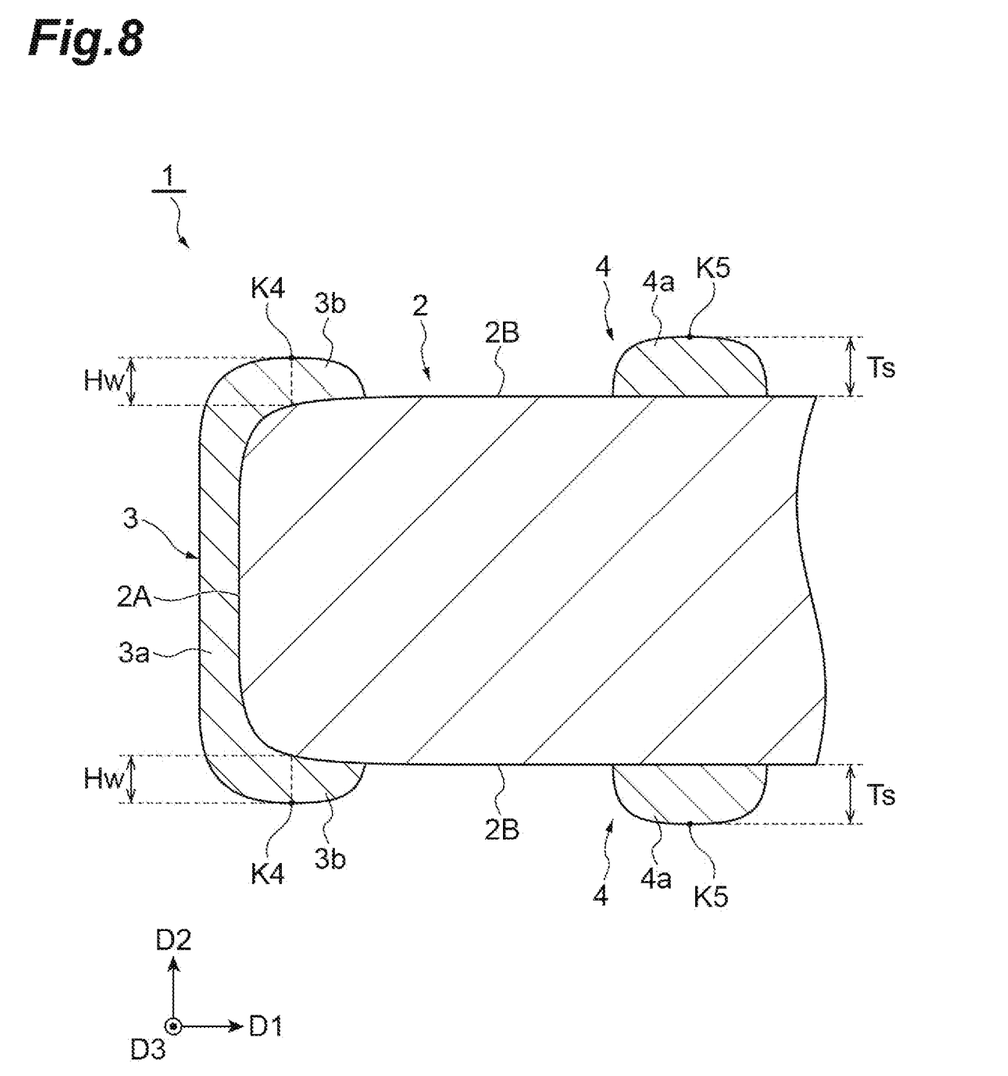
FIG. 8 is an enlarged view of a main part of the multilayer capacitor when viewed from a facing direction of a pair of main surfaces.

FIG. 8 is an enlarged view of a main part of the multilayer capacitor when viewed from the facing direction of the pair of main surfaces. In FIG. 8, one side of the end surfaces 2A and 2A is illustrated, but the other side of the end surfaces 2A and 2A has the same configuration. As illustrated in FIG. 8, in the multilayer capacitor 1, a distance between a surface of the first external electrode 3 at an apex position K4 of the first external electrode 3 and the side surface 2B when viewed from the facing direction D3 of the pair of main surfaces 2C and 2C is defined as Hw.

The apex position K4 of the first external electrode 3 is at a position of the first external electrode 3 that is farthest from the element body 2 in the width direction (the facing direction D2 of the pair of side surfaces 2B and 2B). Here, the apex position K4 is positioned at the wraparound part 3b of the first external electrode 3 that wraps around the side surface 2B. When a perpendicular line is drawn from the apex position K4 of the first external electrode 3 toward the side surface 2B in the facing direction D2 of the pair of side surfaces 2B and 2B, Hw corresponds to a length until the perpendicular line comes into contact with the side surface 2B from the apex position K4.

Also, as illustrated in FIG. 8, in the multilayer capacitor 1, a distance between a surface of the second external electrode 4 at an apex position K5 of the second external electrode 4 and the side surface 2B when viewed from the facing direction D3 of the pair of main surfaces 2C and 2C is defined as Ts. The apex position K5 of the second external electrode 4 is at a position of the second external electrode 4 that is farthest from the element body 2 in the width direction (the facing direction D2 of the pair of side surfaces 2B and 2B). Here, the apex position K5 is positioned at the main body part 4a of the second external electrode 4. When a perpendicular line is drawn from the apex position K5 of the second external electrode 4 toward the side surface 2B in the facing direction D2 of the pair of side surfaces 2B and 2B, Ts corresponds to a length until the perpendicular line comes into contact with the side surface 2B from the apex position K5.

When Hw and Ts are defined as described above, in the multilayer capacitor 1, Ts>Hw is satisfied for each of the pair of second external electrodes 4 and 4. When Ts=Hw, a thickness in the width direction of the second external electrode 4 at the apex position K5 is equal to a thickness in the width direction of the first external electrode 3 at the apex position K4. When Ts<Hw, the thickness in the width direction of the second external electrode 4 at the apex position K5 becomes smaller than the thickness in the width direction of the first external electrode 3 at the apex position K4.

In the multilayer capacitor 1, since Ts>Hw is satisfied, the thickness in the width direction of the second external electrode 4 at the apex position K5 becomes larger than the thickness in the width direction of the first external electrode 3 at the apex position K4. Therefore, in the multilayer capacitor 1, when viewed from the facing direction D3 of the pair of main surfaces 2C and 2C, an amount of protrusion of the second external electrode 4 in the width direction is larger than an amount of protrusion of the first external electrode 3 in the same direction.

As described above, in the multilayer capacitor 1, when 0<Y is satisfied at least on the curved surface P1 side, even if at least one of the pair of main surfaces 2C and 2C is formed as a convex curved surface P1, the element body 2 can be prevented from protruding with respect to the first external electrode 3 in the facing direction D3 of the main surfaces 2C and 2C. Thereby, a posture of the multilayer capacitor 1 tends to be stable in a length direction, and self-alignment of the multilayer capacitor 1 at the time of mounting is facilitated.

Also, in the multilayer capacitor 1, when Y<Ht is satisfied at least on the curved surface P1 side, the element body 2 insufficiently protruding in the facing direction D3 of the pair of main surfaces 2C and 2C can be prevented. Thereby, a suction head of a pickup device or the like can be easily brought into contact with the main surface 2C of the element body 2, and pick-up performance of the multilayer capacitor 1 at the time of mounting can be improved. Further, in the multilayer capacitor 1, when Ht>Hs is satisfied on both sides of the pair of main surfaces 2C and 2C, a thickness of the first external electrode 3 is sufficiently secured regardless of which main surface 2C is used as a mounting surface. Therefore, a posture of the multilayer capacitor 1 in the length direction tends to be more stable, and stability of mounting can be improved.

In the multilayer capacitor 1, when Ts>Hw is satisfied for each of the pair of second external electrodes 4 and 4, an amount of protrusion of the second external electrode 4 in the width direction is larger than an amount of protrusion of the first external electrode 3 in the width direction, and a sufficient mounting area of the second external electrode 4 can be secured. Thereby, the posture of the multilayer capacitor 1 tends to be stable in the width direction, and the self-alignment of the multilayer capacitor 1 at the time of mounting is further facilitated.

Hereinafter, an example of the present disclosure will be described. In the present example, first, a plurality of samples of a multilayer capacitor having the same configuration as that of the multilayer capacitor 1 were prepared, and Ht, Y, and Hs were actually measured. The number of samples was 10, and a size of each sample was 3216 size.

Figure 9A:
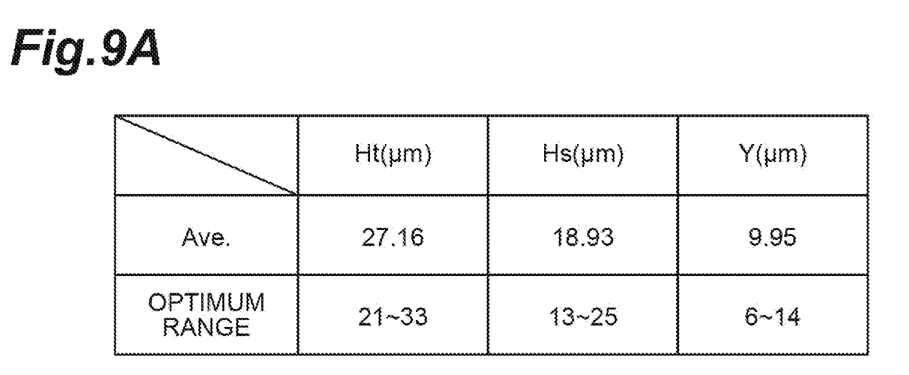
FIG. 9A is a diagram showing actual measurement results of Ht, Y, and Hs.
Figure 9B:
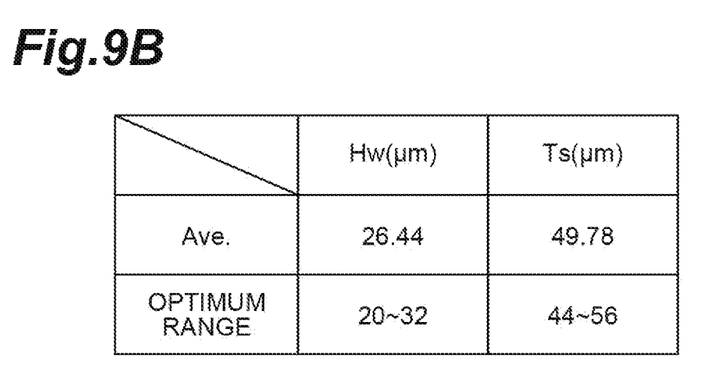
FIG. 9B is a diagram showing actual measurement results of Hw and Ts.

FIG. 9A is a diagram showing actual measurement results of Ht, Y, and Hs. FIG. 9B is a diagram showing actual measurement results of Hw and Ts. In the actual measurement, each dimension was measured using a measuring microscope in a cross section obtained by center polishing the sample from each of an end surface side, a side surface side, and a flat surface side. An average of measured values at each measurement point in each sample was calculated for each of Ht, Hs, Y, Hw, and Ts.

As shown in FIG. 9A, in each of the above-described samples, an average value of Ht was 27.16 μm, an average value of Hs was 18.93 μm, and an average value of Y was 9.95 μm. From these results, it can be estimated that an optimum range of Ht is 21 μm to 33 μm, an optimum range of Hs is 13 μm to 25 μm, and an optimum range of Y is 6 μm to 14 μm. As shown in FIG. 9B, in each of the above-described samples, an average value of Hw was 26.44 μm and an average value of Ts was 49.78 μm. From these results, it can be estimated that an optimum range of Hw is 20 μm to 32 μm and an optimum range of Ts is 44 μm to 56 μm.

Figure 10:
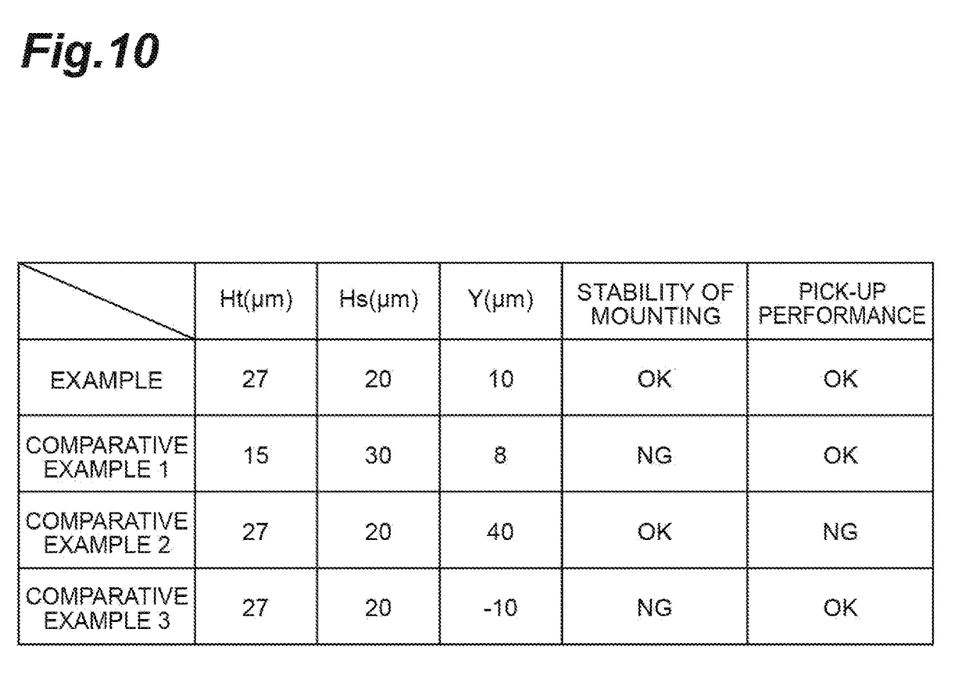
FIG. 10 is a diagram showing results of effect confirmation tests of the present disclosure.

FIG. 10 is a diagram showing results of effect confirmation tests of the present disclosure. In this test, a sample satisfying both 0<Y<Ht and Ht>Hs was used as the example, and a sample satisfying only 0<Y<Ht was used as comparative example 1. Also, a sample in which Y>Ht was used as comparative example 2, and a sample in which Y<0 was used as comparative example 3. In the example, Ht was 27 µm, Hs was 20 µm, and Y was 10 µm. In comparative example 1, Ht was 15 µm, Hs was 30 µm, and Y was 8 µm. In comparative example 2, Ht was 27 µm, Hs was 20 µm, and Y was 40 µm. In comparative example 3, Ht was 27 µm, Hs was 20 µm, and Y was −10 µm.

Evaluation items were two items including stability of mounting and pick-up performance. In regard to the stability of mounting, both of the pair of first external electrodes were observed in the sample after mounting, and one in which both of the first external electrodes did not float with respect to a substrate was estimated as "OK," and one in which one of the first external electrodes was floated with respect to the substrate was estimated as "NG." However, NG in the stability is not necessarily a failure in mounting. In regard to the pick-up performance, a pickup test (the number of evaluations n=10000) using a mounting device was conducted, and a case in which a pick-up failure was not occurred was estimated as "OK," and a case in which a pick-up failure occurred was estimated as "NG."

As shown in FIG. 10, both the stability of mounting and the pick-up performance could be achieved in the example. In comparative examples 1 and 3, although the pick-up performance could be secured, the stability of mounting could not be secured. In comparative example 2, although the stability of mounting could be secured, the pick-up performance could not be secured. From this result, it was confirmed that satisfying 0<Y<Ht and Ht>Hs as in the present disclosure contributes to improving the stability of mounting and the pick-up performance of the multilayer capacitor.

What is claimed is:

1. A multilayer capacitor comprising:
an element body including a pair of end surfaces facing each other, and a pair of side surfaces and a pair of main surfaces extending in a facing direction of the pair of end surfaces between the pair of end surfaces;
a plurality of first internal electrodes disposed in a facing direction of the pair of main surfaces in the element body and extending in the facing direction of the pair of end surfaces;
a plurality of second internal electrodes disposed in the facing direction of the pair of main surfaces in the element body and extending in a facing direction of the pair of side surfaces;
a pair of first external electrodes disposed on the pair of end surfaces to wrap around the pair of side surfaces and the pair of main surfaces; and
a pair of second external electrodes disposed on the pair of side surfaces to wrap around the pair of main surfaces and to be spaced apart from the first external electrodes, wherein
at least one of the pair of main surfaces is a curved surface which is curved in a convex shape,
when viewed from the facing direction of the pair of side surfaces, when a distance between a surface of the first external electrode at an apex position of the first external electrode and the main surface is defined as Ht, and a distance between the apex position and an apex position of the main surface in the facing direction of the pair of main surfaces is defined as Y, 0<Y<Ht is satisfied for each of the pair of first external electrodes at least on the curved surface side,
when viewed from the facing direction of the pair of end surfaces, a distance between a surface of the second external electrode at an apex position of the second external electrode and the main surface is defined as Hs, Ht>Hs is satisfied for each of the pair of second external electrodes on both sides of the pair of main surfaces, and
when viewed in the facing direction of the pair of main surfaces, when a distance between a surface of the first external electrode at an apex position of the first external electrode and the side surface is defined as Hw, and a distance between a surface of the second external electrode at an apex position of the second external electrode and the side surface is defined as Ts, Ts>Hw is satisfied for each of the pair of second external electrodes.

* * * * *